Figure 1:
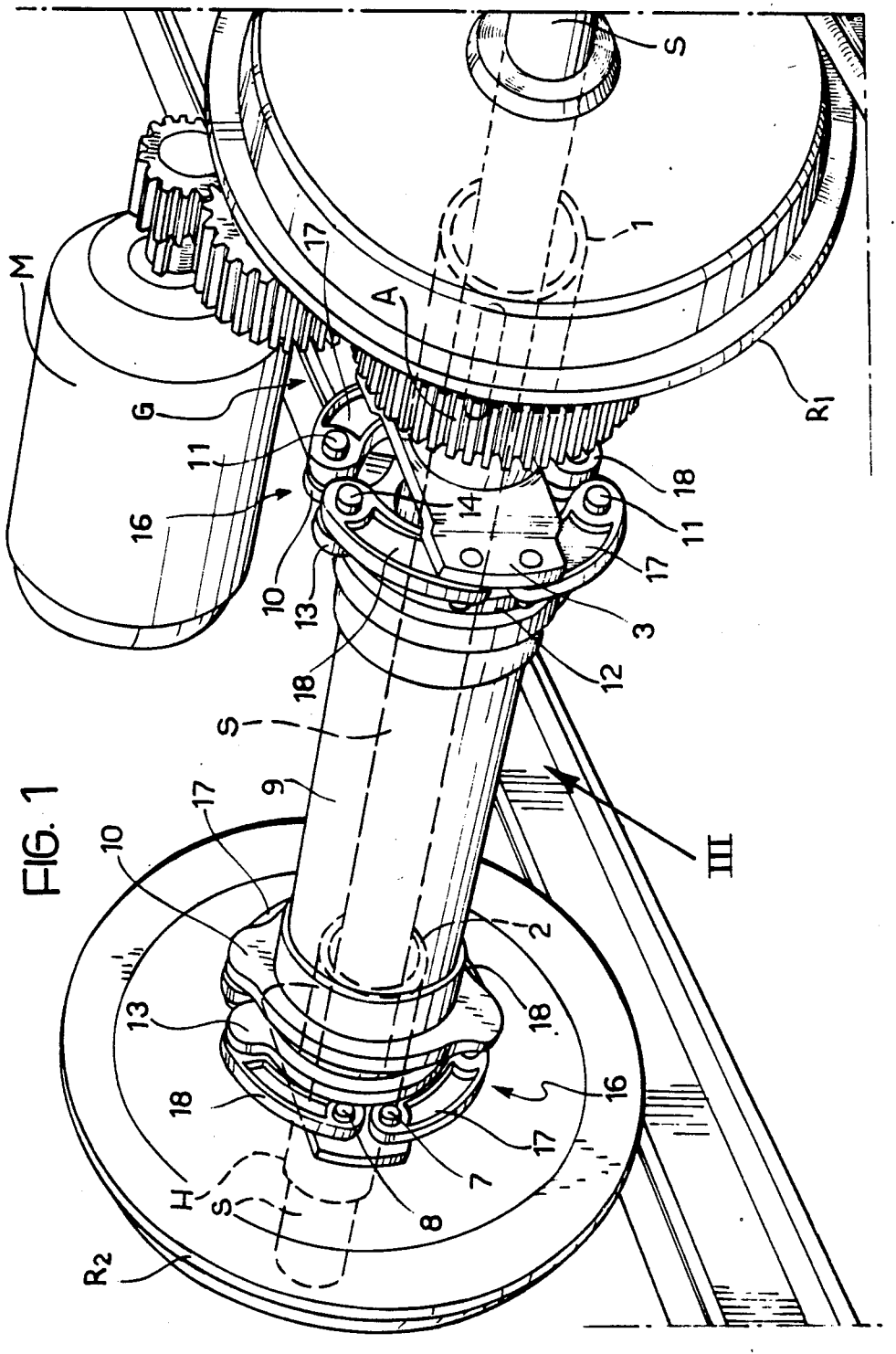

United States Patent [19]

Santanera et al.

[11] Patent Number: 4,674,410
[45] Date of Patent: Jun. 23, 1987

[54] CONSTANT-VELOCITY TRANSMISSION, PARTICULARLY FOR CONNECTING THE DRIVE MOTOR TO THE DRIVEN WHEELS OF A MOTORIZED RAILWAY VEHICLE

[75] Inventors: Oreste Santanera, Pino Torinese; Ettore Pavese, Vinovo, both of Italy

[73] Assignee: Fiat Ferroviaria Savigliano S.p.A., Turin, Italy

[21] Appl. No.: 832,955

[22] Filed: Feb. 26, 1986

[30] Foreign Application Priority Data

Feb. 26, 1985 [IT] Italy .............................. 67199/85[U]

[51] Int. Cl.$^4$ .......................... B61C 9/44; F16D 3/12; F16D 3/48
[52] U.S. Cl. ...................................... 105/131; 464/69; 464/92; 464/180
[58] Field of Search ..................... 105/96, 131; 464/69, 464/89, 92, 138, 162, 180, 183

[56] References Cited

U.S. PATENT DOCUMENTS

| | | | |
|---|---|---|---|
| 2,179,425 | 11/1939 | Ruegg | 105/131 |
| 2,688,937 | 9/1954 | Giger | 105/131 |
| 3,830,166 | 8/1974 | Dieling et al. | 105/131 X |
| 4,170,945 | 10/1979 | Kayserling | 105/131 X |

FOREIGN PATENT DOCUMENTS

| | | | |
|---|---|---|---|
| 7021 | 1/1980 | European Pat. Off. | 105/131 |
| 2451966 | 5/1976 | Fed. Rep. of Germany | 464/69 |

*Primary Examiner*—Randolph A. Reese
*Assistant Examiner*—David F. Hubbuch
*Attorney, Agent, or Firm*—Sughrue, Mion, Zinn, Macpeak, and Seas

[57] ABSTRACT

A constant-velocity transmission, particularly for connecting the drive motor to the driving axle of a motorized railway vehicle, comprises two hollow coaxial shafts interconnected by a resilient coupling and provided with respective end flanges articulated, through two groups of four connecting rods, to respective flanges of a hollow driven shaft and a hollow driving shaft coupled for rotation with the axle. The transmission allows considerable relative movements, both radial and axial, between the driving and driven shafts without the use of members which require lubrication.

6 Claims, 5 Drawing Figures

CONSTANT-VELOCITY TRANSMISSION, PARTICULARLY FOR CONNECTING THE DRIVE MOTOR TO THE DRIVEN WHEELS OF A MOTORIZED RAILWAY VEHICLE

The present invention relates to a transmission for connecting two rotary shafts which are coaxial with each other or variably offset, and allowing the two shafts to move axially towards and away from each other during the transmission of drive without giving rise to appreciable axial or radial forces between the two connected shafts.

More particularly, the invention concerns a transmission of the type specified above which can be used to connect a drive motor to the driving axle of a motorized railway vehicle.

Transmissions of the type defined above are known which use universal joints and shafts which are rendered extensible by splined couplings or similar devices. Such splined shafts require lubrication since they are subjected to friction, and are the weak and limiting point in universal transmissions, particularly for applications which, like the railway field, may call for practically no maintainence over long periods and the transmission of high powers in very dirty conditions.

For this reason, many types of transmission have been developed for connecting the drive motors, located on the bogie, to the axles, while allowing all the movements necessary for the functioning of the main suspensions. Among these, floating-ring and idle-lozenge transmissions may be noted.

However, the development of ever-faster motorized railway vehicles and the need always to reduce their harmful effect on the track, which has necessitated a reconsideration of the traditional mechanical arrangements of locomotives in favor of ever-lighter bogies, gives rise to a need for transmissions capable of operating even with considerable relative movement between the shafts to be connected.

Although the railway transmissions mentioned above are able to absorb the movements of the primary transmissions, they are inadequate because of the limited vertical movements which they allow between the axles and the bogie chassis (that is between the axles and motors with their transmissions) and because they are almost unable to allow the axial and rotational movements (still between the axle and the motors with their transmissions) which the displacement of the motors from the bogies require.

The object of the invention, therefore, is to provide a transmission which is able to allow considerable relative movements, radial, axial and angular, between the shafts which they connect without the use of members (splines, roller guides or the like) requiring lubrication, and with two important conditions:

1—the absence of the transmission, between the axles and motors, of appreciable forces acting in parallel to (and hence disturbing) the vertical and transverse suspensions;

2—adequate constancy, that is equality or only small momentary differences, of the velocities of the two shafts connected, this condition being necessary both to limit the forces on the whole unit (motors-transmissions) and because of the conditions imposed by the modern frequency-controlled electric drives with motors without commutators.

In order to achieve this object the present invention provides a constant-velocity transmission, particularly for connecting a drive motor to a driving axle of a motorized railway vehicle, characterized in that it comprises:

a hollow driving shaft freely surrounding one end of the axle and rotated by the motor, the driving shaft, having a radial driving flange, a hollow driven shaft coupled with the other end of the axle and having a radial driven flange, two hollow shafts one inside the other, which surround the axle and each of which carries two end flanges facing the driving and driven flanges, resilient coupling means between the outer and inner shafts, and two groups of four connecting rods articulating the driving flange and the driven flange respectively to the flanges of the outer and inner shafts so that each of the driving and driven flanges is connected to the respective flange of the outer shaft or the inner shaft by means of two diametrically-opposed connecting rods.

According to the invention, each group of four connecting rods has respective joints disposed at the vertices of an octagon with sides of two different lengths alternating with each other.

These joints are of the ball type and are preferably but not necessarily flexible couplings.

The resilient connecting means between the outer shaft and the inner shaft may be constituted by conical rubber rings, rubber blocks working under shear and compression, or by "Silentbloks". In practice, the resilient connecting means allow the transmission of axial and radial forces, as well as relative rotation, between the two shafts both when their axes coincide and when their axes do not coincide.

Figure 2:
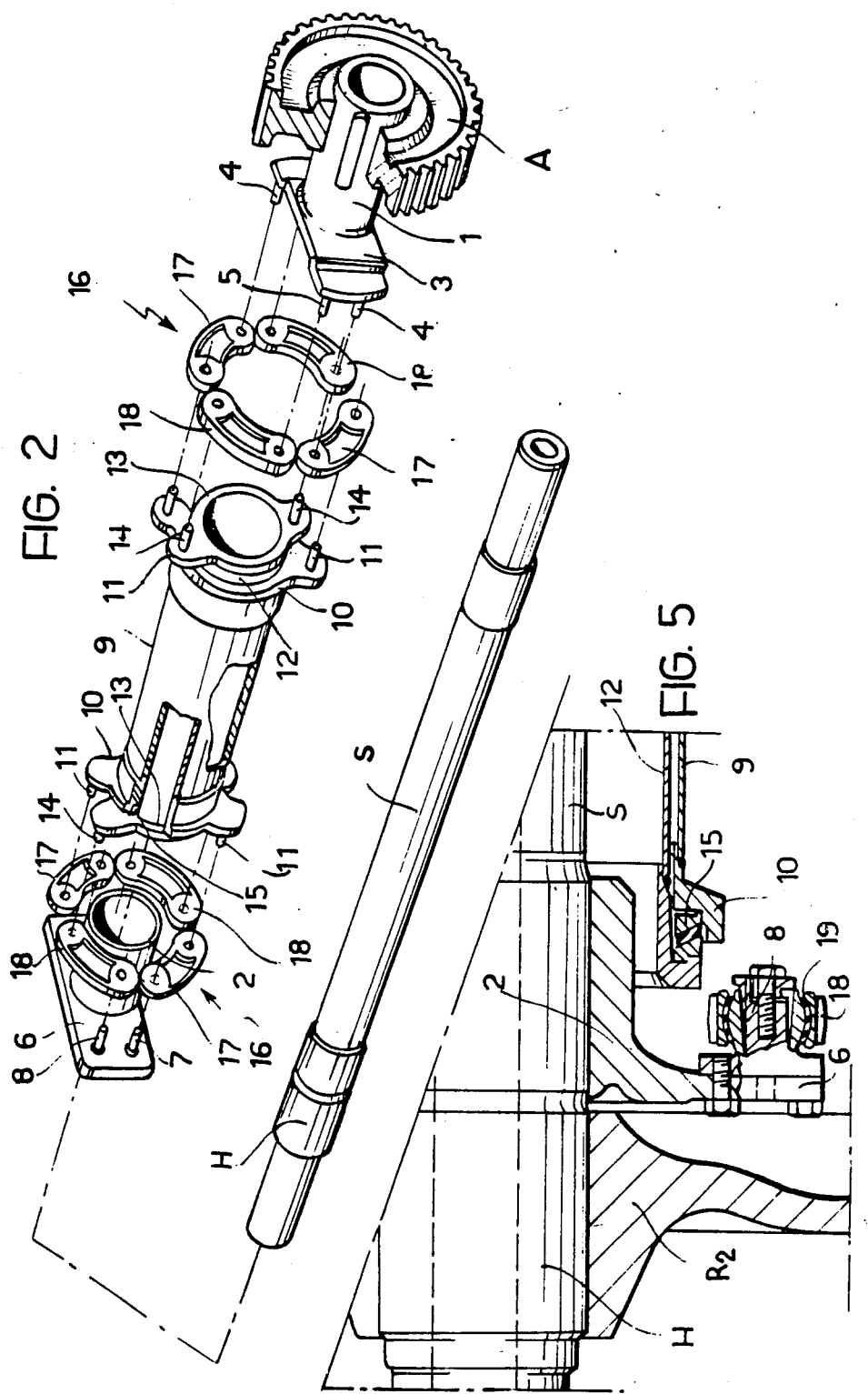
Figure 3:
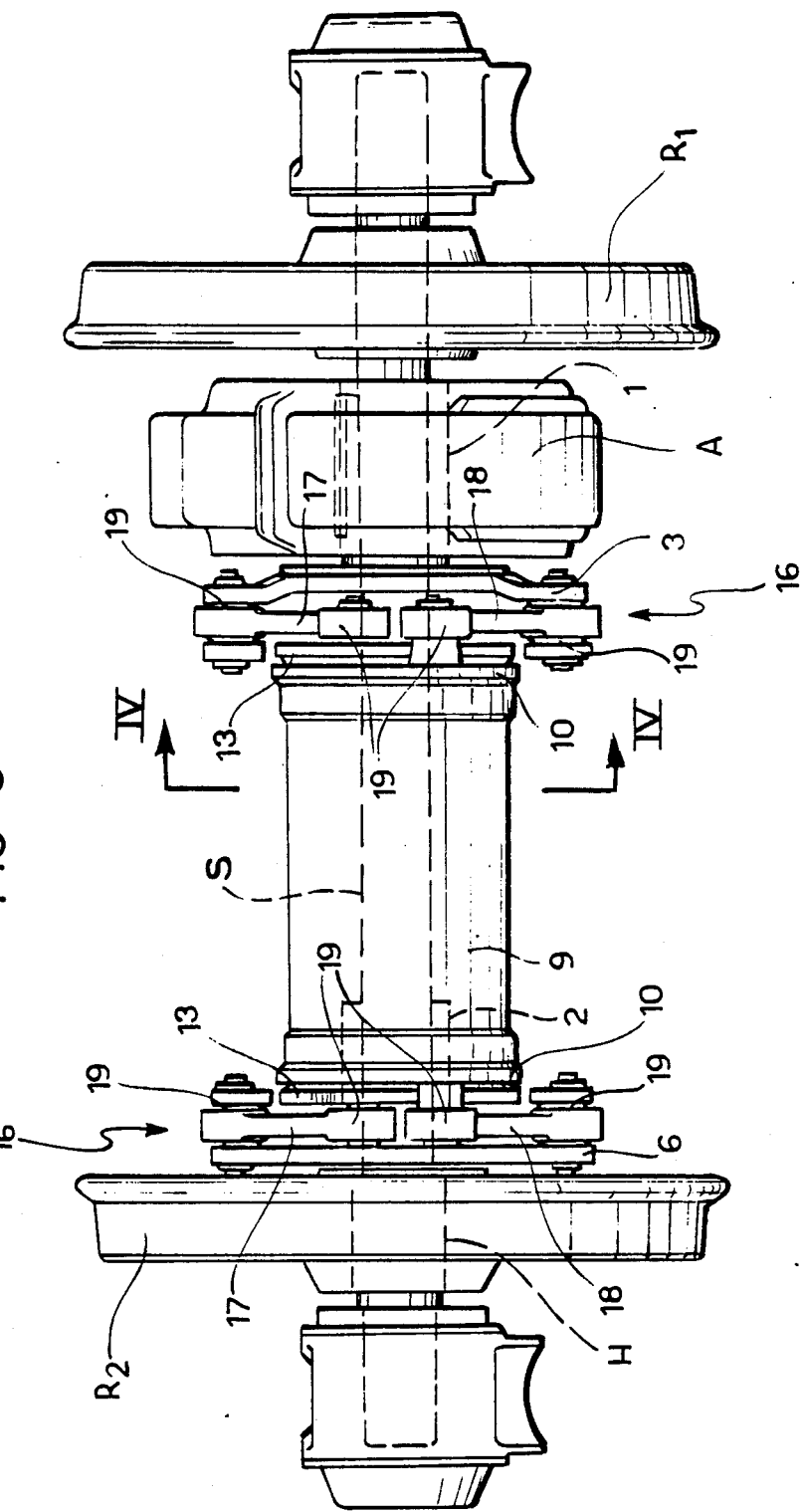
Figure 4:
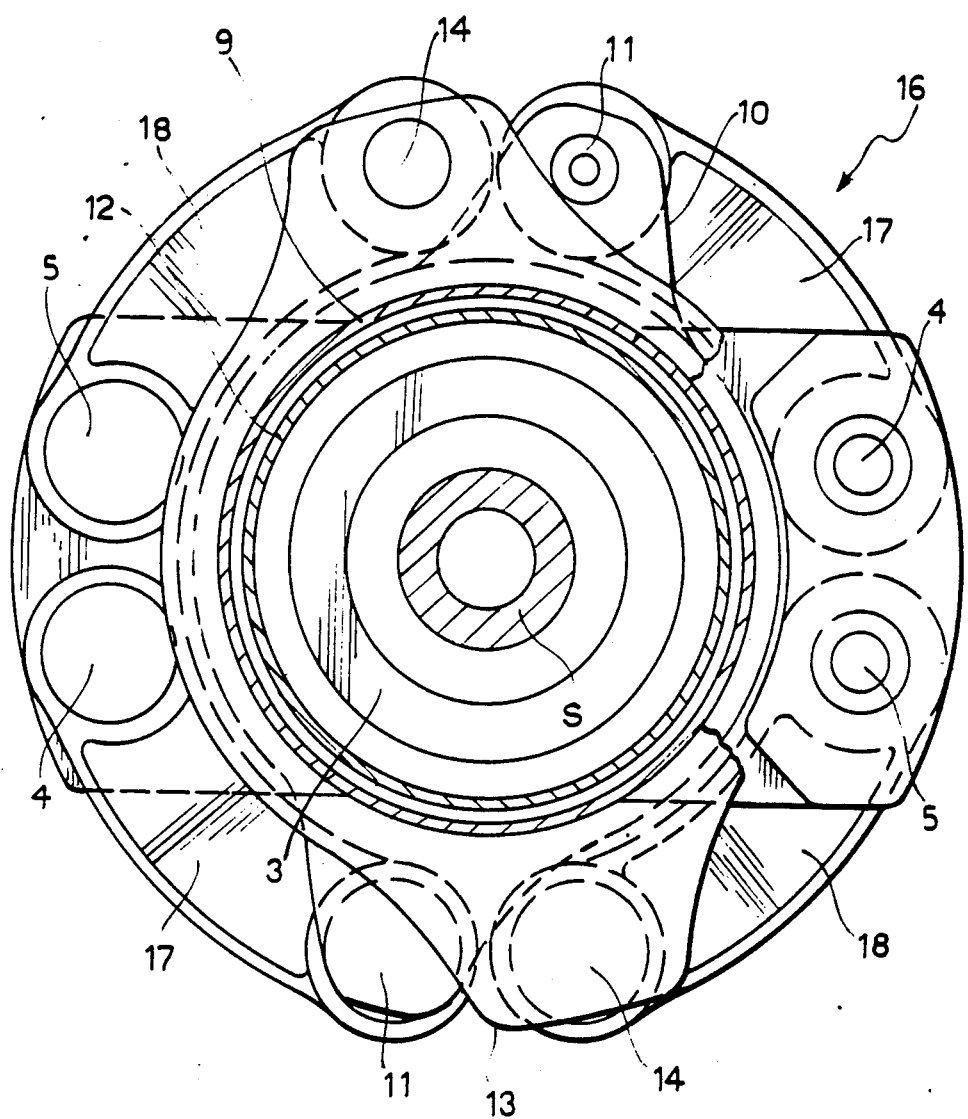

The invention will now be described with reference to the appended drawings, provided purely by way of non-limiting example, in which:

FIG. 1 is a perspective view of a transmission according to the invention applied to a railway locomotive, FIG. 2 is a partially-sectioned, exploded perspective view of the transmission, FIG. 3 is a front elevational view taken on the arrow III of FIG. 1, FIG. 4 is a section taken on the line IV—IV of FIG. 3, and FIG. 5 is a section illustrating a detail of the transmission on an enlarged scale.

With reference initially to FIG. 1, a drive motor M is installed in a locomotive for driving a driving axle including an axle S carrying two wheels $R_1$, $R_2$.

A hollow shaft 1 supported by supports, not shown, is fixed to the motor M and surrounds one end of the axle S with play, and a hollow shaft 2 is coupled for rotation with an enlarged portion H of the axle S (FIG. 5). The shaft 1 is rotated by the drive motor M through a reduction gear, generally indicated G, the latter element being constituted by a gear wheel A keyed to the shaft 1.

The shaft 1 will be termed the "driving shaft" below, while the shaft 2 will be termed the "driven shaft".

The driving shaft 1 has a flange 3 at its inner end which, in the embodiment illustrated, is formed by two radial wings carrying two pairs of axial articulation pins 4 and 5 (FIGS. 2 and 4).

The inner end of the driven shaft 2 has a flange 6 identical to the flange 3 and carrying two pairs of axial articulation pins 7, 8. The pins 4, 5, 7 and 8 are aligned with each other on the general axis of the transmission or on the axis of the two wheels $R_1$, $R_2$.

A hollow outer shaft 9 is interposed between the flanges 3 and 6 of the shafts 1 and 2. The shaft 9 has two flanges 10 at its ends which form two radial wings from which respective axial pins 11 project.

An inner shaft 12 passes through the shaft 9 with radial clearance and, in its turn, has end flanges 13 defining radial wings which carry respective axial articulation pins 14 staggered angularly relative to the pins 11 of the outer shaft 9.

The shafts 9 and 12 are interconnected by resilient elements 15 whose constructional form may be of the type illustrated in FIG. 5. These resilient elements 15 may be constituted by conical rings of elastomeric material, rubber blocks working under shear and compression, or even by "Silentbloks", arranged to allow the transmission of axial and radial forces between the two shafts 9 and 12 and to allow relative rotation both when the axes of these shafts coincide and when the axes do not coincide.

Two groups of connecting rods, indicated 16, articulate the driving flange 3 and the driven flange 6 to the flanges 10 and 13 of the shafts 9 and 12.

Each group 16 includes two pairs of diametrically-opposed connecting rods 17, 18, possibly of arcuate form.

The two connecting rods 17 of each group 16 connect the pins 4 or 7 of the flange 3 or 6 with the pins 11 of the outer shaft 9, while the connecting rods 18 connect the pins 5 or 8 of the flange 3 or 6 with the pins 14 of the inner shaft 12.

The connection of each connecting rod 17, 18 with the respective articulation pins is achieved by means of ball joints, normally of flexible type, the constructional form of which may be of the type indicated 19 in FIG. 5. It should be noted, however, that these joints need not necessarily be of the flexible type.

The arrangement of the connecting rods 17 and 18 and their pins is such that each group 16 has its joints 19 disposed, with the transmission at rest, at the vertices of an octagon having sides of two different lengths alternating with each other. This is clearly seen in FIG. 4 in which it is noted that the longer sides of the octagon pass through the axes of the articulation pins 4, 11 and 5, 14 (or 7, 11 and 8, 14) of the connecting rods 17 and 18, while the shorter sides pass through the axes of the remaining contiguous articulation pins 4, 5 (or 7, 8) and 11, 14.

It will be clear that the transmission according to the invention is able to allow a considerable degree of both radial and axial relative movements between the driving shaft 1 and the driven shaft 2, without the need for recourse to members which require lubrication, such as splined couplings, roller guides or the like. At the same time, the transmission according to the invention ensures the absence of appreciable forces acting in parallel with the vertical and transverse suspensions of the vehicle in use, as well as perfect constant velocity conditions between the two shafts 1 and 2.

Naturally, the principle of the invention remaining the same, the constructional details and forms of embodiment may be varied widely with respect to that described and illustrated, without thereby departing from the scope of the present invention.

We claim:

1. A constant-velocity transmission, for connecting a drive motor to a driving axle, wherein it comprises:
   a hollow driving shaft freely surrounding one end of the axle and rotated by the motor, the driving shaft having a radial driving flange;
   a hollow driven shaft coupled for rotation with the other end of the axle and having a radial driven flange;
   a hollow outer shaft interposed between the driving and driven shafts and carrying respective radial end flanges facing the driving and driven flanges;
   a hollow inner shaft inserted in the hollow outer shaft with clearance and carrying respective radial end flanges facing the driving and driven flanges;
   resilient coupling means between the outer and inner, shafts, and
   two groups of four connecting rods articulating the driving flange and the driven flange respectively to the flanges of the outer and inner shafts so that each of the driving and driven flanges is connected to the respective flange of the outer shaft or the inner shaft by means of two diametrically-opposed connecting rods.

2. A transmission according to claim 1, wherein each group of four connecting rods has its respective articulations disposed at the vertices of an octagon with sides of two different lengths alternating with each other.

3. A transmission according to claim 1, wherein the resilient coupling means are constituted by rings of elastomeric material.

4. A transmission according to claim 1, wherein the resilient coupling means are constituted by rubber blocks working under shear and compression.

5. A transmission according to claim 1, wherein the connection between each connecting rod and the respective flange is achieved by ball joints.

6. A transmission according to claim 5, wherein the ball joints are of the flexible type.

* * * * *